UNITED STATES PATENT OFFICE.

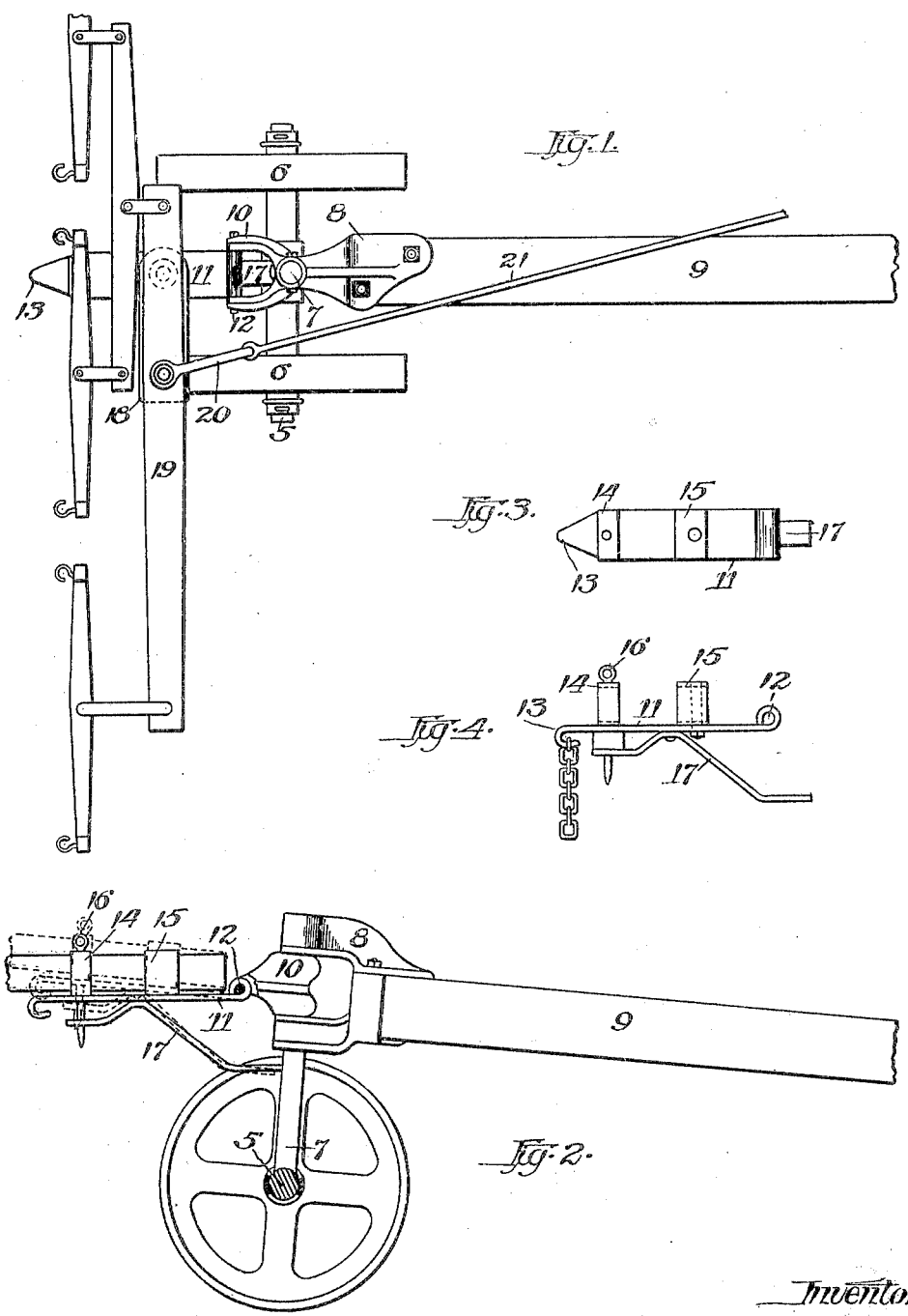

JOHN W. PRIDMORE AND WILLIAM WEBBER, OF CHICAGO, ILLINOIS, ASSIGNORS TO INTERNATIONAL HARVESTER COMPANY, A CORPORATION OF NEW JERSEY.

TONGUE-TRUCK.

No. 802,316.          Specification of Letters Patent.          Patented Oct. 17, 1905.

Application filed March 6, 1905. Serial No. 248,386.

*To all whom it may concern:*

Be it known that we, JOHN W. PRIDMORE and WILLIAM WEBBER, citizens of the United States, residing at Chicago, in the county of Cook and State of Illinois, have invented certain new and useful Improvements in Tongue-Trucks, of which the following is a specification, reference being had to the accompanying drawings, forming a part thereof.

Our invention relates to tongue-trucks, and is designed particularly for attachment to harvesting and other machines of like character.

It consists in certain details of construction adapting it for use with two or more draft-animals and also means whereby the draft appliances are prevented from falling upon the ground when from any cause they are not being drawn forward by the draft-animals.

The objects of our invention are to provide an attachment of the kind indicated that will be cheap and simple in construction, strong, and comprising few parts. We attain these objects by the mechanism illustrated in the accompanying drawings, in which—

Figure 1 is a top plan view of the attachment with a three-horse draft appliance connected therewith; Fig. 2, a side elevation, partly in section, of a part of Fig. 1. Fig. 3 is a plan view of the draft-plate in detail, and Fig. 4 is a side elevation of Fig. 3.

Similar numerals refer to similar parts throughout the various views.

5 represents the truck-axle, with the wheels 6 journaled at opposite ends thereof. A central standard 7 is secured to the axle and has its upper end journaled in a yoke 8, secured to the front end of a stub-tongue 9, that may be attached to a harvesting or other machine by any of the usual means employed for that purpose. A draft-clevis 10 is secured to the standard 7 between the two arms of the yoke 8, and a draft-plate 11 is connected to the clevis by the transversely-arranged clevis-pin 12 at its rear end and is provided with a draft-hook 13 at its forward end, and two loops 14 and 15 are secured to its upper side and adapted to receive the rear end of a tongue that is held therein by means of a pin 16. A plate 17 is secured to its lower side, the forward end of which forms a hammer-strap for the pin 16 and an evener attachment that may be pivoted upon the pin between the hammer-strap and the bottom of the draft-plate. The rear end of the plate 17 is adapted to contact with the central standard 7 and limit the downward swing of the draft-plate and appliances connected thereto. A laterally-projecting draft-arm 18 is secured to the top of the loop 15, and a three-horse evener 19 is pivotally connected with its outer end, and a clevis 20 connects the two to a harvester or other machine by means of the draft-rod 21.

What we claim as our invention, and desire to secure by Letters Patent, is—

1. In a tongue-truck, the combination of an axle with wheels journaled at opposite ends thereof, a stub-tongue, a yoke secured to the forward end of said stub-tongue, a standard secured to the axle and vertically pivoted in said yoke, a draft-clevis secured to said standard, a draft-plate having a transverse pivotal connection with said clevis, and a plate secured to the draft-plate projecting rearward and downward and adapted to contact with said standard to limit the downward swing of said draft-plate.

2. In a tongue-truck, the combination of an axle with wheels journaled at opposite ends thereof, a stub-tongue, a yoke secured to the forward end of said stub-tongue, a standard secured to the axle and vertically pivoted in said yoke, a draft-clevis secured to said standard, a draft-plate having a transverse pivotal connection with said clevis, a draft-pin, a supplemental plate secured to the draft-plate, said supplemental plate projecting forward and downward to form a hammer-strap for said draft-pin, and rearward and downward to adapt it to contact with said standard to limit the downward swing of said draft-plate.

3. In a tongue-truck, the combination of an axle with wheels journaled at opposite ends thereof, a stub-tongue, a yoke secured to the forward end of said stub-tongue, a standard secured to the axle and vertically pivoted in said yoke, a draft-clevis secured to said standard, a draft-plate having a transverse pivotal connection with said clevis, a pole-socket secured to the upper side of the plate, a laterally-projecting bar secured to the pole-socket, a three-horse evener pivotally connected with one end of said bar by means of a clevis, a draft-plate connected with said clevis, a draft-pin through the pole-socket and projecting below the draft-plate, a supplemental plate secured to the draft-plate, said supplemental plate projecting forward and downward to form a hammer-strap for said draft-pin, and rearward and downward to adapt it to contact with said standard to limit the downward swing of said draft-plate and draft appliances.

In witness whereof we hereto affix our signatures in presence of two witnesses.

JOHN W. PRIDMORE.
WILLIAM WEBBER.

Witnesses:
GEO. W. HENDERSON,
ALFRED M. CHRISTIAN.